C. KUENTZEL.
TIRE MAKING MACHINE.
APPLICATION FILED JAN. 25, 1916.
1,273,071.
Patented July 16, 1918.
2 SHEETS—SHEET 1.
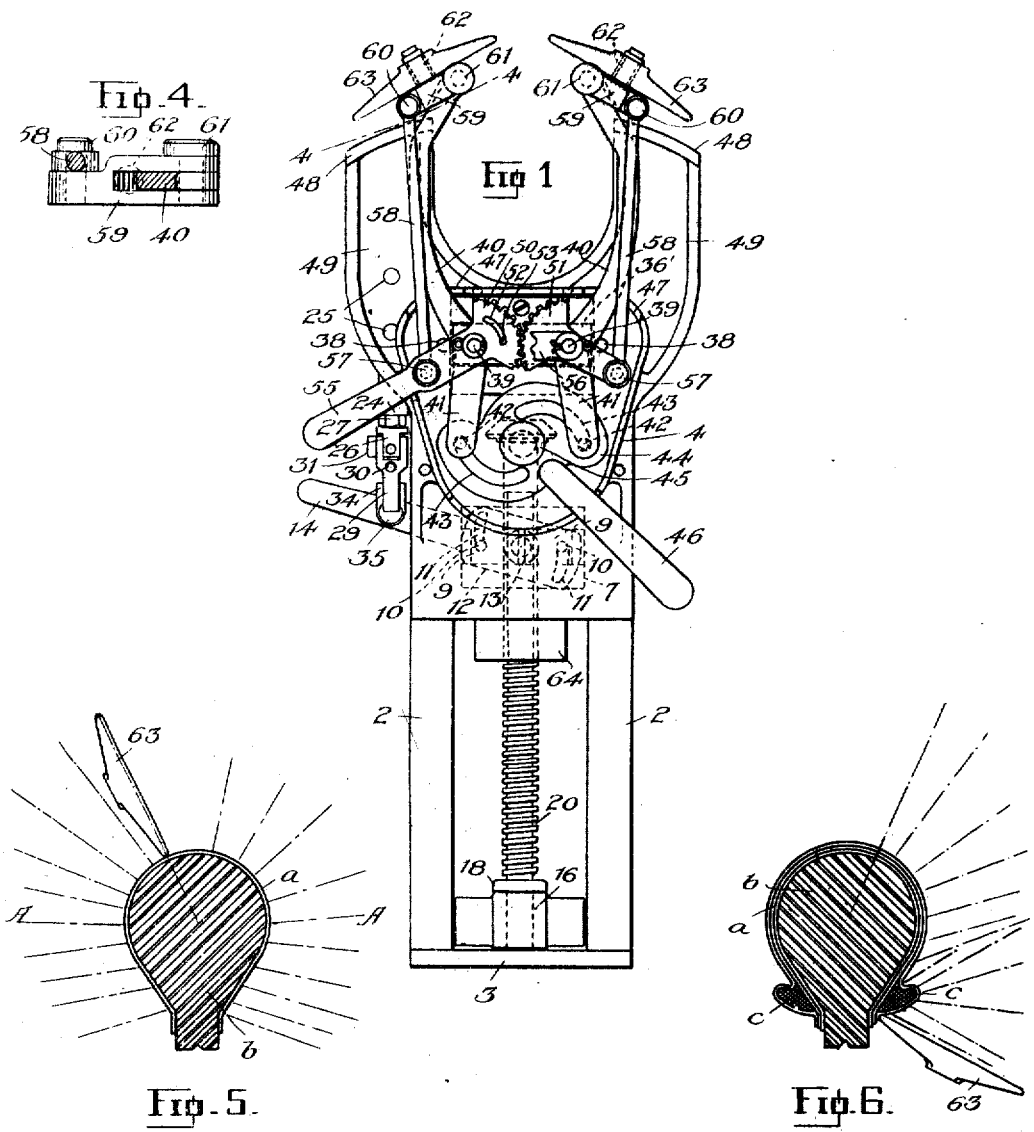
Inventor
EURT KUENTZEL
By Wm. E. Dyre
Attorney C. KUENTZEL.
TIRE MAKING MACHINE.
APPLICATION FILED JAN. 25, 1916.
1,273,071.
Patented July 16, 1918.
2 SHEETS—SHEET 2.
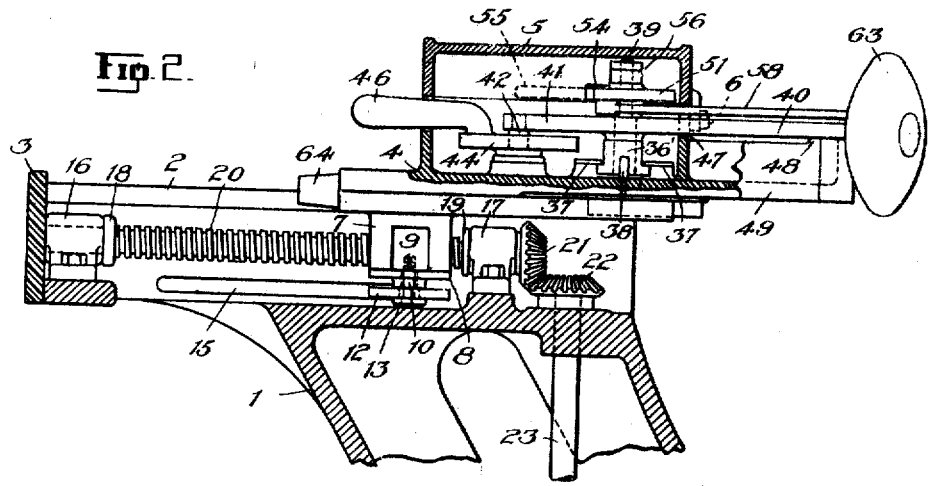
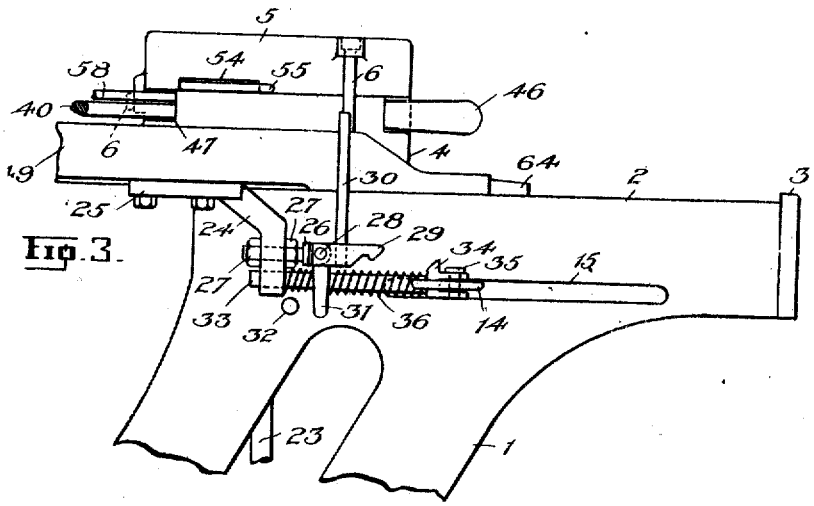
Inventor
CURT KUENTZEL
By Wm E Dyre
Attorney

UNITED STATES PATENT OFFICE.

CURT KUENTZEL, OF YOUNGSTOWN, OHIO, ASSIGNOR TO THE REPUBLIC RUBBER COMPANY, OF YOUNGSTOWN, OHIO, A CORPORATION OF OHIO.

TIRE-MAKING MACHINE.

1,273,071. Specification of Letters Patent. Patented July 16, 1918.

Application filed January 25, 1916. Serial No. 74,119.

*To all whom it may concern:*

Be it known that I, CURT KUENTZEL, a subject of the Emperor of Germany, residing at Youngstown, in the county of Mahoning and State of Ohio, have invented certain new and useful Improvements in Tire-Making Machines; and I do hereby declare the following to be a full, clear, and exact description of the invention, such as will enable others skilled in the art to which it appertains to make and use the same.

My present invention relates to machines for building automobile tires, but more particularly to apparatus for shaping or "stitching" into position the successive layers of friction fabric, or other body materials employed in the process of tire building, and for applying the same with perfectly smooth unwrinkled surfaces.

This invention, therefore, has for its primary object accomplishment of the results aforesaid with unusual accuracy, certainty and precision, through the instrumentality of suitable stitching rolls, and novel mechanism for manipulating them.

The invention has for a further object the production of novel means for presenting stitching rolls to the surfaces operated upon at angles constantly varying with the curvature of such surfaces, and at all times approximating a right angular presentation as the stitching advances from tread to bead lines.

A further object is the production of means which positively prevents the stitching rolls from slipping while in passage over the curved surfaces of tire carcasses.

A further object is the production of novel means whereby the stitching rolls may be caused to travel similarly around the outer edges of tire-beads by a continuous operation.

With the foregoing and other objects and advantages in view, the present invention further consists in certain combinations of elements, novel details of construction, and arrangements of parts which will be hereinafter particularly described and then pointed out in the appended claims.

In the accompanying drawings which constitute part of the present application for Letters Patent, and whereon like characters refer to corresponding parts in the several views:

Figure 1 is a top plan view of the invention assembled and ready for use.

Fig. 2 is a side elevation of the invention with parts broken away for the purpose of disclosing the manipulating and feeding mechanisms.

Fig. 3 is a fragmentary view also in side elevation, showing the feed-nut-locking and automatic releasing means.

Fig. 4 is a detached detail view in side elevation of one roll-tilting link taken on the line 4—4 of Fig. 1.

Fig. 5 is a transverse sectional view of an ordinary ring-core covered by a single layer of friction fabric or duck, showing also a single detached stitching roll in operative position, and by dot and dash lines its various operative positions with relation to the ring core and tire carcass as the stitching progresses, and, Fig. 6 is a view corresponding with Fig. 5, but showing in addition tire beads applied, and substantially the angles assumed by stitching rolls while passing around such tire beads.

Reference being had to the drawings and numerals thereon, 1 indicates a cast iron frame or support mounted as is usual with this class of machines, upon a suitable bedplate (not shown) and adjustable thereon to provide for the manufacture of tires of varying diameters. This cast frame or support 1, as best shown by Figs. 1 and 2 of the drawings, includes parallel top rails 2, 2 constituting a track or runway, and a connecting plate 3 projecting slightly above the plane of said tracks.

Mounted upon the tracks 2, 2 is a sled 4, also by preference of cast iron and of hollow formation having a corresponding cover or top closure 5 secured in position by means of bolts such as 6, while depending centrally from the base of sled 4, between rails 2, 2 is a guide member 7 channeled transversely and closed beneath by a cover plate 8, thereby constituting a housing for split-nut 9 the parts whereof may thus partake of a relative transverse movement when occasion requires within the channel aforesaid of guide member 7. This transverse movement of the members or parts of nut 9 is accomplished by means of a pin 10 depending from each, which pins project through openings of liberal proportions in opposite ends of the cover plate 8 aforesaid, and extend into oppositely disposed segmental slots 11, 11 formed in an underlying cam 12. This cam 12 is pivotally secured beneath plate 8 by means of a headed screw 13 depending from the center of the plate, and is provided with a turning lever 14 projecting at one side through a horizontal slot 15 in the supporting frame 1 to open or close the split-nut 9.

Mounted beneath, and centrally with relation to the horizontal rails 2, 2, in suitable bearings 16 and 17 flanked by collars 18 and 19, respectively, is a horizontally arranged feeding screw 20 adapted to be engaged by split nut 9, and bearing at one end a beveled gear 21 constantly in mesh with a corresponding gear 22, keyed to a vertical driving shaft 23 which may be driven from any suitable source of power or prime mover (not shown).

Thus it is obvious that a forward thrust of lever 14 serves to close split-nut 9 upon the threads of feed screw 20, and that so long as held in this position the entire sled 4 and its attending parts will be advanced. For the purpose, therefore, of rendering this advance or feeding operation automatic a feed-nut-locking and releasing mechanism is provided including a depending bracket 24 bolted to the base of sled 4 as at 25, and having a rearwardly projecting horizontal link 26 rigidly affixed thereto by means of nuts 27. Pivotally mounted upon this link 26 by a pin 28 passing through its forked end, is a hook 29 from opposite sides of which project upper and lower unlatching levers 30 and 31 respectively, the former for manual operation, and the latter adapted to be automatically operated by engagement at times with a fixed stud 32 projecting from the side of frame 1 directly into its path of travel.

Loosely supported in depending bracket 24 there is also a reciprocating rod 33 upon the rear end of which is secured a latch keeper 34 the same being bifurcated to receive lever 14 to which it is pivotally secured by means of a through pin 35; while interposed between this keeper 34 and the relatively fixed bracket 24 is a coil spring 36 surrounding the rod 33 as shown by Fig. 3.

Within the forward end of sled 4 is located a transversely arranged block 36' slightly widened at its base, and slidingly retained by flanges 37, 37, rising from the bottom of sled as an integral part thereof, thereby providing for a slight longitudinal movement of said block 36' between limiting stops 38, 38 at each end thereof for purposes which will later appear. Affixed to the said block 36' near opposite ends thereof are vertical pivot pins 39, 39, upon which are mounted oppositely disposed levers 40 and 40 for imparting transverse movement to suitable shaping-rolls at the outer end of each as will hereinafter more fully appear. These levers 40, 40, each have rearward extensions 41, 41 provided with downturned pintles 42, 42, engaging arcuate slots 43, 43, in a common disk cam 44 the latter being pivotally mounted as at 45 within sled 4; while projecting radially from the said cam, through a slot in the rear edge of sled 4, is a handle 46 by means of which the cam 44 may be partially rotated one way or the other. The forward or advance end of levers 40, 40 are outwardly curved and project through suitable slots 47, 47, at the front upper edge of sled 4, where they are accorded a sliding bearing, in addition to which they find also a similar outer bearing near their operative ends, upon arcuate ribs 48, 48 carried by forward extensions 49, 49 of the sled 4 at opposite sides thereof.

Pivotally mounted upon the same vertical pins 39, 39 immediately above levers 40, 40, is a corresponding pair of oppositely disposed intermeshing gear-sectors 50 and 51, one of which sectors, 50, is broken by an arcuate slot 52 engaging a relatively fixed pin 53 to prevent accidental separation of said sectors, and moreover this sector 50 is extended through slot 54 in the side of sled 4 to constitute a manipulating lever 55, as shown by Figs. 1, 2 and 3. Immediately above these sectors 50 and 51 the aforesaid pivot pins 39 and 39 are spaced and connected by a tie bar 56, one end of which is shown broken away at the right of Fig. 1.

Within the confines of sled 4 both gear sectors 50 and 51 are equipped with pivot pins 57, 57 around which turn the inner ends of roll manipulating rods 58, 58, which latter, like their coöperating levers 40, 40, project forward through slots 47, 47 in operative parallelism to points where they are pivotally connected to their respective levers 40 by means of links 59, 59, and pivots 60, 61 passing therethrough.

As shown by Fig. 4 the links 59 are each bifurcated to receive the outer ends of levers 40, and are provided centrally with outwardly projecting pintles 62 upon each of which are journaled oppositely disposed stitching rolls 63 and 63, as shown by Figs. 1 and 2. Obviously, these rolls 63 may be mounted upon ball bearings if desired, and by reference to Figs. 1, 2 and 3 it will be seen that the base of sled 4 may be equipped with a rearwardly projecting cushion 64 of rubber or other yielding material arranged and adapted to impinge upon plate 3 connecting the rear end of tracks 2, 2, whenever sled 4 is returned to starting position.

Briefly stated, the operation is as follows:

A sheet or sheets of friction fabric, or other suitable body material, such as a having been applied as usual to an ordinary revolving ring-core b, the stitching or smoothing rolls 63 and 63 are presented, as diagrammatically indicated by one of said rolls in Fig. 5, upon opposite sides of the tread section of the tire carcass in course of construction, with the said rolls so positioned that they occupy substantially radial planes with relation to the said ring-core, and with sled 4 retracted to its starting position upon tracks 2, 2, or a position the reverse of that shown by the drawings.

Lever 14 is now thrown forward from the position shown by Fig. 3 to that of Fig. 1, which results in closing split-nut 9 upon the feed screw 20, in which position it is interlocked by engagement of hook 29 with keeper 34, the spring 36 in the meantime being compressed. The sled 4 and attending parts are thus slowly advanced under influence of the power driven screw 20.

The operator by means of the handle 46, the oppositely disposed levers 40, 40, turning upon their fulcrums 39, 39, and intervening connections, now presses the rolls 63 against the material to be shaped as they are being advanced radially with respect to the ring-core, the degree of this pressure being thus manually controlled according to requirements. As this operation and application of the shaping rolls progresses toward the bead edges of the carcass under construction, the other hand of the operator is occupied in advancing the manipulating lever 55, which, by agency of sectors 50 and 51, and their pivotally connected rods 58, 58 turn both links 59, 59 around their respective pivots 61, 61 in arcs transverse to the plane of the ring-core and the tire carcass in the process of formation thereon.

This tilting action of the shaping rolls 63 is thus also manually controlled, and results in a substantially right angular presentation of said rolls to the curved surfaces operated upon at all times, insures a more effective smoothing of the materials under treatment, and positively prevents the said rolls from slipping radially as the work progresses, the latter being a very common occurrence with rolls which are not relatively adjustable, and particularly after passing the circumferential center of ring-cores as indicated by the line A—A, Fig. 5.

It will be noted also that after bead-rings such as c, c have been applied to a tire carcass, as shown by Fig. 6, the smoothing or stitching operation proceeds without interruption. Here also a quick manipulation of lever 55 changes the angularity of rolls 63 in substantial conformity with the curvature of the bead members.

At the completion of a forward or advance movement of sled 4 upon its raceway 2, 2, as each layer of fabric is effectually rolled into position upon a tire carcass, the depending unlatching lever or finger 31 is automatically tripped by engagement with stud 32 projecting from the side of frame 1, thus turning latch 29 upon its pivot pin 28 and disengaging it from its keeper 34, whereupon reaction spring 36 instantly returns the lever 14, and disengages the split nut 9 from the feed screw 20, enabling the operator to return sled 4 again to its starting position. On the other hand, if it is desired for any reason to interrupt this advance movement of sled 4 before the completion of its course upon raceway 2, 2, this may be instantly accomplished by a touch of the upstanding latch lever 30 with the thumb of an operator upon the hand with which he manipulates lever 55, the result being the same as if latch 29 were tripped as before described. As stated the pivot pins 39 and 39 are securely affixed to and carried by block 36' which has a slight longitudinal movement between the stops 38 and 38 in order to compensate for a slight unevenness in the carcass surface caused by occasional fabric splices. These splices invariably cross the tire carcass diagonally so that both rolls 63 cannot at the same instant engage the same splice, and as a consequence when one of the rolls passes over a splice of this character the two are collectively shifted in a lateral direction a distance equal to the added thickness of fabric, this being permitted by a corresponding movement in the opposite direction of the said block 36' and pivot pins 39, 39, carried thereby.

The foregoing being a description of my improved shaping or stitching rolls, and manually controlled mechanism for directing and regulating the pressure thereof, in the best form of construction and arrangement of correlative parts at present known to me, it should be understood that the said parts and arrangement thereof as shown and described, may be variously changed, and rearranged, without in the least departing from the spirit of my invention, and to all such changes, modifications and equivalents I lay claim the same as if hereinbefore set forth.

Having thus described my invention, what I now claim and desire to secure by Letters Patent is:

1. A machine for forming tire casings including, in combination, oppositely disposed manually controlled operating levers, a cam element for actuating said levers in reverse directions, a manipulating rod adjacent each of said operating levers, a roll-supporting link pivotally connected to each of said levers and to its coöperating manipulating rod, a stitching roll rotatively mounted upon each supporting link intermediate its pivotal connections, and means for reciprocating said rods longitudinally.

2. A machine for forming tire casings including in combination oppositely disposed manually controlled operating levers, a cam element for actuating said levers in reverse directions, a manipulating rod adjacent each of said operating levers, roll-supporting links each pivotally connected at its ends to the outer end of a lever and its coöperating rod respectively, a stitching roll rotatively mounted upon each of said supporting links intermediate its pivotal connections, and means for reciprocating said rods longitudinally.

3. A machine for forming tire casings including in combination oppositely disposed operating levers, manipulating rods adjacent said levers, roll-supporting links each pivotally connecting one of said levers with one of said rods at the outer ends thereof, a pintle projecting outwardly from each of said supporting links at right angles thereto and intermediate its pivotal connections, a stitching roll rotatively mounted upon each of said pintles, means for actuating said levers in reverse directions, and means for reciprocating said rods longitudinally.

In testimony whereof I affix my signature, in presence of two subscribing witnesses.

CURT KUENTZEL.

Witnesses:
ETHEL JOHNSON,
GEO. F. LEWIS.